United States Patent [19]
Eastham et al.

[11] 3,851,231
[45] Nov. 26, 1974

[54] SHORT STATOR INDUCTION MOTOR

[75] Inventors: John Frederick Eastham, Long Ditton; Christopher Durrant English, Burwell; Geoffrey Edward Brown, Sawston, all of England

[73] Assignee: Tracked Hovercraft Limited, London, England

[22] Filed: June 19, 1973

[21] Appl. No.: 371,380

[30] Foreign Application Priority Data
June 20, 1972 Great Britain.................... 28784/72

[52] U.S. Cl. ................................. 318/135, 310/13
[51] Int. Cl. ............................................ H02k 41/02
[58] Field of Search.......... 310/13; 318/135, 224 R, 318/225 R, 226

[56] References Cited
UNITED STATES PATENTS

| | | |
|---|---|---|
| 2,575,716 | 11/1951 | Kilgore ........................... 318/226 X |
| 2,773,230 | 12/1956 | Emley .............................. 318/226 |
| 3,566,224 | 2/1971 | Vallauri ............................ 318/135 |
| 3,621,311 | 11/1971 | Starck .............................. 310/13 |
| 3,622,818 | 11/1971 | Payen .............................. 310/13 |

Primary Examiner—G. Z. Rubinson
Attorney, Agent, or Firm—Cameron, Kerkam, Sutton, Stowell & Stowell

[57] ABSTRACT

In a short stator electric induction machine, provision is made for reducing the generation of circulating currents when windings are connected in parallel. The coils from which the windings are formed are grouped in sets, the number of coils of each set being equal to the number of branches of the parallel circuit. The coils of each set are located close to one another. One coil from set pair is connected in each branch of the parallel circuit so that each branch comprises coils spaced along the entire length of the stator.

8 Claims, 14 Drawing Figures

SHORT STATOR INDUCTION MOTOR

This invention relates to alternating current electric short stator induction motors of the type having a wound "stator" of limited length which co-operates with an unwound conductive "rotor" of substantially greater length.

The commonest type of short stator motor is the linear induction motor though they may be of the rotary type in which the stator does not extend around the full circumference of the machine. The invention applies to all types of short stator machine but is described in relation to linear motors.

Linear induction motors are frequently used for traction purposes, the stator commonly being carried by the vehicle and supplied with current picked up from conductor rails running alongside the vehicle track or with current generated on board the vehicle, the rotor being an elongate plate of conductive material running lengthwise of the track and anchored to the ground since it reacts the traction forces.

It is also possible for a linear motor to have the "stator" stationary and the "rotor" movable and in the vehicle traction context a number of wound stator sections would be distributed along the length of the track, a conductive "rotor" element being carried by the vehicle and co-operating successively with the stator sections in its passage along the tract. This arrangement is generally uneconomic due to the high cost of the large number of wound stator elements, but it is nevertheless within the scope of the invention.

Linear induction motors share with rotary induction motors in which the stator does not extend around the full circumference of the motor, the so-called "short stator" effect, a principal manifestation of which is a pronounced difference between the voltages induced in coils at the leading end of the stator and the voltages induced in coils at the trailing end of the stator, the latter being the greater.

It is frequently required, for securing the desired current and voltage conditions in a stator winding, to connect two sections of a winding in parallel but in the case of machines exhibiting the short stator effect this leads to unacceptable circulating currents around the parallel network since one of the winding sections is necessarily displaced from the other along the length of the stator so that the induced voltages in one brance of the parallel network are greater than those induced in the other branch.

Another case where a parallel connection of two winding sections is frequently desired is that of the pole-changing motor where, for one pole number, the winding sections are connected in series, whilst for the other pole number the winding sections are connected in parallel so that the direction of current flow in selected winding groups is reversed in the parallel configuration as compared with the series configuration.

The present invention enables windings sections or groups which are mutually displaced along the length of the stator, to be connected in parallel without giving rise to circulating induced currents of significant magnitude.

According to the invention there is provided a stator for an alternating current short stator electric induction machine having a plurality of groups of windings mutually displaced along the length of the stator each group comprising at least one phase band for each phase of a plural phase supply from which current is to be supplied to the respective phase bands, the groups of windings being adapted for connection in a plurality of parallel circuits, one for each phase, each phase band being formed by at least one set of coils, all sets containing the same number of coils as one another, the coils of each such set being located closely adjacent to one another, each phase band being sub-divided into as many phase band parts as there are coils in each set, each containing one coil from each set of coils of the phase band, the parallel circuit for each phase having as many branches to be connected in parallel with one another as there are coils in each set, each branch including a phase band part from each of the groups of windings, each of the coils of a set being so connected as to provide a pole of the same polarity.

Where the motor is of the pole changing type, that is to say where current direction is reversed in selected coils of the winding by switching means, to change the pole number and thus the synchronous speed of the motor, each of the groups of windings may be divided into a plurality of sub-groups, the sub-groups of each winding group being interleaved with the sub-groups or blocks of the other groups of windings along the length of the stator, so that the coils in which the current is to be reversed are distributed along the length of the stator.

When there are two parallel branches and two groups of windings, one method of switching, to obtain a change of pole number, is to change over the current supply connections for each phase, to the intermediate point, in each of the parallel branches, which is the junction between the phase band parts of the two groups of windings in the branch whereby the direction of current flow is reversed in the phase band parts of one of the groups of windings.

With this method of switching it is necessary, if circulating currents are to be avoided for one branch of the parallel network, to have the phase band part of one windings group and that of the other windings groups connected in one order whilst the other brach has the phase band parts of the two windings groups connected in the reverse order, in relation to the passage of current at a given instant.

The invention will be more readily understood from the following description of certain embodiments thereof, illustrated in the accompanying drawings in which.

Figure 3:
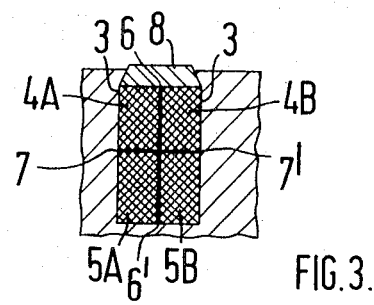
FIG. 3 is a section through a slot showing how first coils and second coils of a two-layer winding may be accommodated in a single slot.
Figure 4:
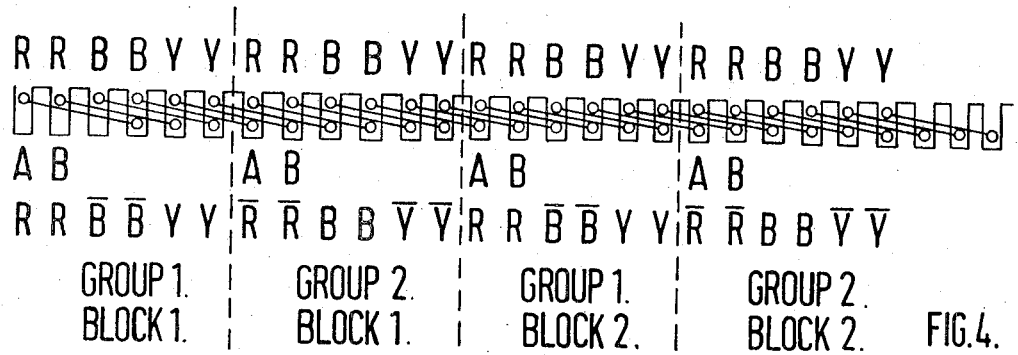
FIG. 4 is a diagrammatic cross-section of a winding in which first coils and second coils are accommodated in adjacent slots.
Figure 13:
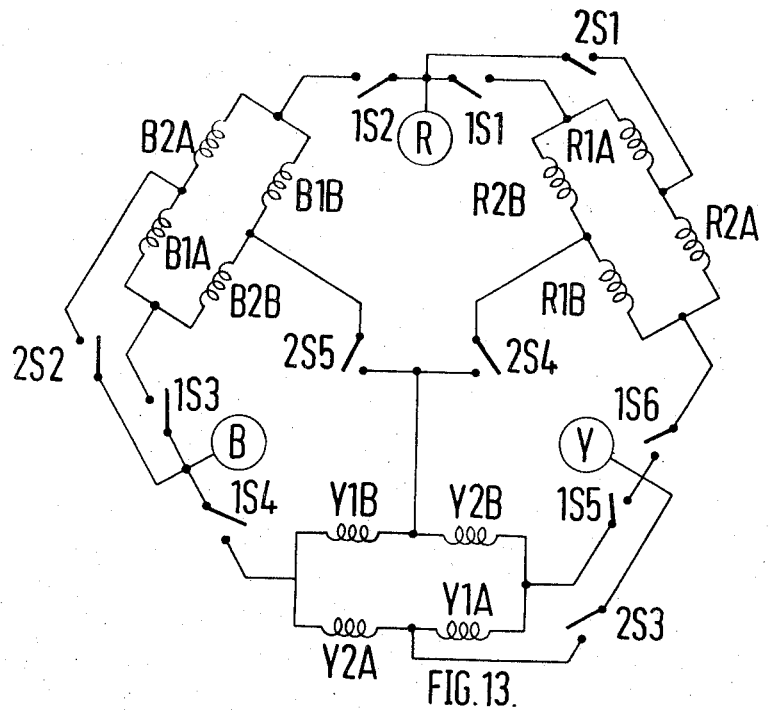
Figure 14:
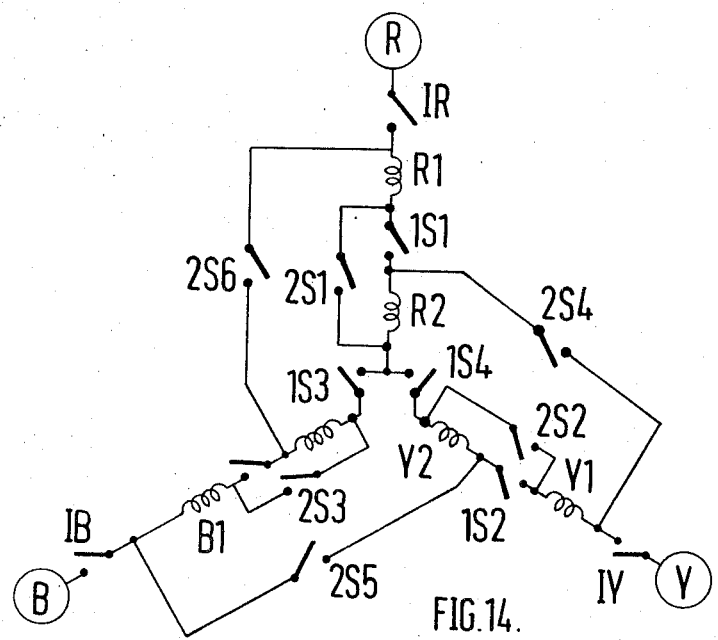

FIG. 13 is a schematic circuit diagram of another arrangement according to FIGS. 3 and 4 illustrating arrangements for selecting between the FIG. 3 configuration and the FIG. 4 configuration and at the same time selecting a delta configuration for the former and a star configuration for the latter; and FIG. 14 is a similar circuit diagram of an arrangement not incorporating the invention, to demonstrate how the number of switching contacts may be reduced by use of the invention.

Figure 1:
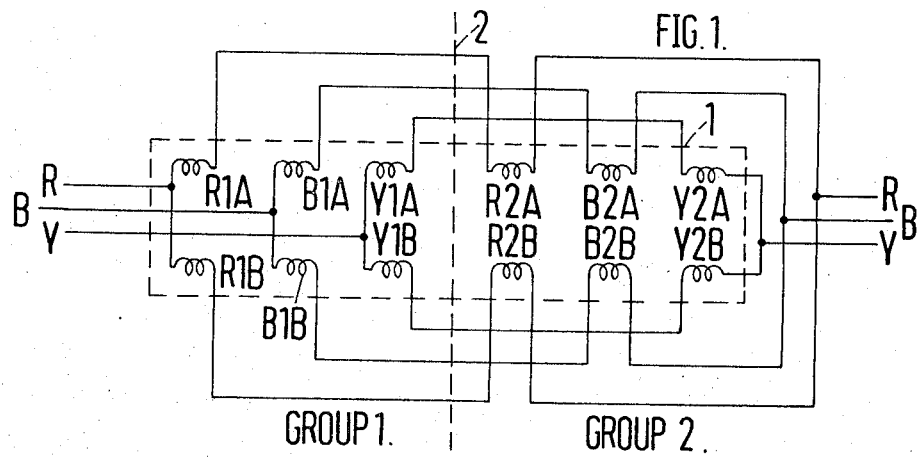
FIG. 1 is a circuit diagram of the invention in its simplest form.

FIG. 1 shows, diagrammatically, a stator core represented by the dotted line rectangle 1 on which are wound coils (R1A,R1B etc. ) which are divided into two groups one on either side of a dotted line 2.

The end of the stator assembly on the left hand side of line 2 may be regarded as the leading end and the end to the right of line 2, the trailing end.

If the coils R1A, B1A, Y1A, were connected, phase band by phase band, in parallel with the coils R2A, B2A, Y2A, the remaining coils (in the lower row) being omitted, the voltages induced in the coils to the right of line 2 would exceed by a significant amount the voltages induced in the coils to the left of line 2 and unacceptable circulating currents would flow around the parallel network.

If, however, each coil has a duplicate coil accommodated in the same or an adjacent slot, to form a matched pair of coils, then a parallel circuit can be built up in which one member of each coil pair is included in one of the branches of the parallel circuit, the other member of the pair being included in the other branch This provides the same overall voltage and currentcharacteristics as a simple parallel arrangement with all leading end coils in one branch and all trailing end coils in the other branch except that the induced voltages in the two branches are equal since every coil in one branch is matched by a coil in the other branch, which is at the same position along the length of the stator core, or very nearly the same position if the coils of a pair are accommodated in adjacent slots.

In FIG. 1 one coil of a pair is denoted "A," and the other member of the pair is denoted "B;" for instance, R1A is the A coil of the red phase coil pair of windings group 1, and R1B is the B coil of the same pair, similarly R2A is the A coil of the red phase coil pair of windings group 2.

When the A and B coils of the coil pair are accommodated in the same slot it is immaterial which coil is treated as the A coil and which the B coil as they are to all intents and purposes identical with one another. When the A and B coils are accommodated in adjacent slots, the two coils are displaced from one another by one slot pitch along the length of the stator and so the voltages induced in the two members of the pair are not quite the same and this leads to a slight imbalance in the induced voltages in the two branches of the parallel circuit. The difference will in general be small enough to be of no consequence.

Where there are many coils in a phase band, this slight imbalance may be mitigated by treating in successive coil pairs of a phase band, the leading coil of the pair and the trailing coil of the pair alternately as the A coil and the B coil respectively, and the B coil and A coil respectively.

Figure 2:
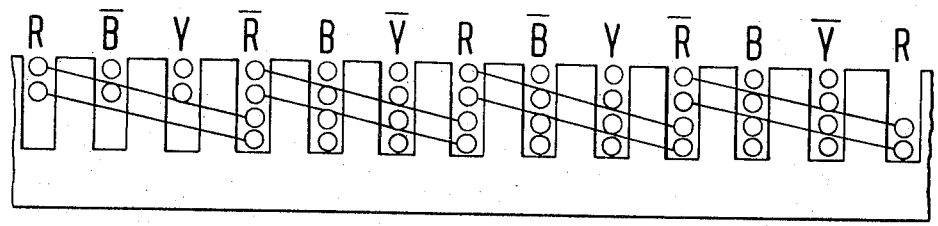
FIG. 2 is a diagrammatic cross-section of a winding arrangement according to the invention.

FIG. 2 shows the method of connection of the actual coils of a four pole winding in which the two coils of a coil pair are accommodated in the same slot.

This is a very basic winding pattern. The windings required for linear traction motors require a large number of slots and a typical winding for this application would have eight coils per phase band and occupy 96 slots plus additional slots to accomodate the return coil sides of the last phase band. In a short stator machine with a two-layer winding there must always be "overhang" slots at each end of the stator containing one coil side, the number of "over-hand " slots being a function of the coil pitch.

In a duplicate-coil arrangement as shown in FIG. 2 with the coil pitch equal to the pole pitch there are four coil sides in each slot of the central part of the stator and two coil sides in the "over-hang" slots at the ends, which are three in number at each end, requiring a total of 15 slots (of which 13 are shown).

FIG. 3 is a cross-section through a slot 3 in the central section of the core of a motor where both the A and B coils are accommodated in the same slot and where the upper layer coil sides 4A and 4B of one pair of coils have to be accommodated in the same slot as the lower layer coil sides 5A and 5B of another pair of coils.

The A and B coil sides in both layers are side by side, separated by insulation 6,6'.

The two layers are separated by insulation 7,7'. A wedge 8 retains the coils in the slot 3.

FIG. 4 shows the physical arrangement of coil pairs where the A and B coils of the pair are accommodated in adjacent slots. This is a straightforward winding scheme with two slots per phase band and giving four poles. The No. 1 group and No. 2 group windings are each subdivided into two sub-groups or blocks which could be interconnected according to FIG. 1. The FIG. 1 arrangement does not give a prallel arrangement with equal induced voltages in the two branches when the mains supply is connected at the junction of R1A and R2A and R1B and R2B (and similarly with the Blue and Yellow phase bands, of course), because then one branch consists wholly of coils of group 1 and the other wholly of coils of group 2.

Figure 5:
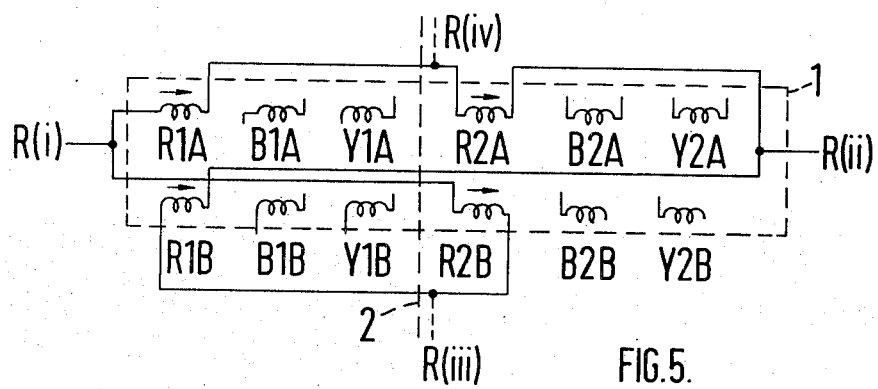
FIG. 5 is a circuit diagram of another form of the invention.
Figure 6:
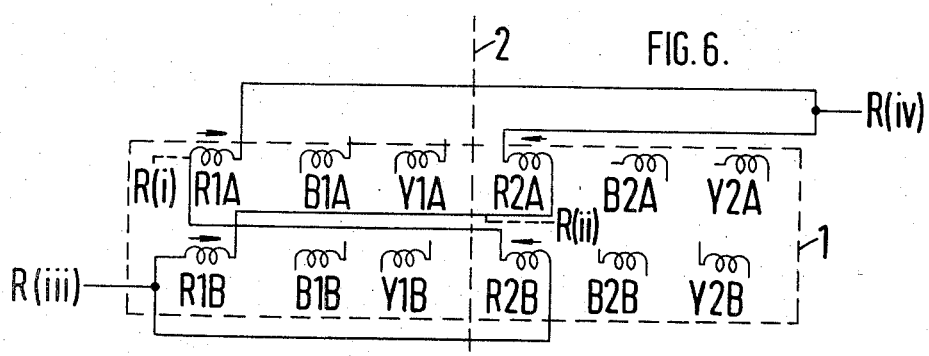
FIG. 6 is a circuit diagram of the form of the invention shown in FIG. 5, but with the mains supply connection points changed so that the direction of current flow in certain coils is reversed as compared with the FIG. 5 arrangement.

FIGS. 5 and 6 show a form of the invention suitable for a pole changing motor where the two pole numbers are obtained by connecting the phase leads from the mains supply to alternative points on the parallel network, one half of the coils being connected in parallel with the other half in each configuration.

Only the connection of the "Red" phase are shown. The connections to each of the other phases are similar. There are two windings groups, group 1 on the left, and group 2 on the right, as with FIG. 1.

The windings are shown, in FIGS. 5 and 6 (and also in FIG. 7, 8 and 9) in the relative positions they occupy on the stator core 1.

In Figure 5, the Red phase mains connections are made at points R(i) and R(ii) and one branch of the parallel network has the Red phase bands R1A and R2A, of windings group 1 and windings group 2, connected in series, in that order, proceeding from R(i) to R(ii), whilst the other branch has the Red phase bands R2B and R1A connected in series, that is to say in the reverse order, proceeding from R(i) to R(ii). The alternative connection points R(iii) and R(iv) are shown at the junctions between phase bands R1B and R2B and the junctions between phase bands R1A and R2A, respectively FIG. 6 shows the arrangement of FIG. 5 with the connections of the Red phase mains made at points R(iii) and R(iv). Now, one parallel branch has phase bands R1B and R2A (reversed), connected in series, whilst the other parallel branch has phase bands R2B (reversed) and R1B, connected in series. As the A and B phase bands R2A and R2B are both reversed, with one of them in each branch, the reversal of the direction of current flow in these two group 2 phase bands does not upset the balance between the voltages induced in the two parallel branches.

Figure 7:
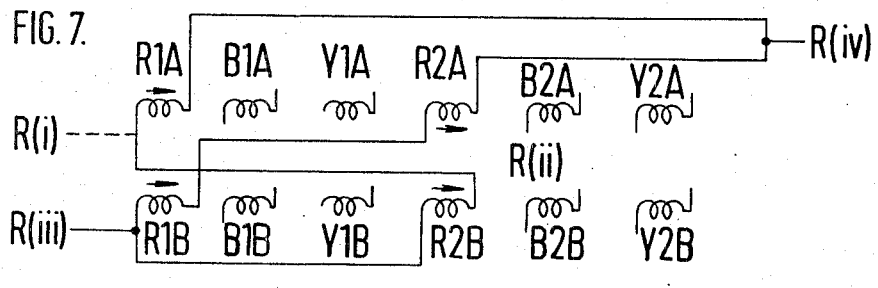
FIG. 7 is a circuit diagram similar to FIG. 4, but with the coils, in which current flow was reversed as aforesaid, connected so that the direction of current flow therein is the same as that of FIG. 5.

FIG. 7 shows the effect of altering the arrangement of FIG. 6 by connecting the group 2 phase bands R2A and R2B so that they are not reversed as in FIG. 6. The Red phase mains connections are made at points R(iii) and R(iv).

Comparing FIG. 7 with FIG. 5, it will be seen that the only difference lies in the transposition, between the two branches of the parallel network, of the phase bands R1A and R1B of the No. 1 windings group. This illustrates the fact that when both coils of a pair are accommodated in the same slot, the labelling of one as the A coil and the other as the B coil is purely arbitrary. Where the coils of a pair are accommodated in adjacent slots, there will be a small difference between the voltages induced in them and therefore a slight, (but acceptable), imbalance, in this respect, between the two branches of the parallel network; which branch has the higher and which the lower of the induced voltages is of no consequence The machine of FIG. 4 can be switched to yield eight poles if the arrangement of FIG. 5 or FIG. 7 is used, by changing the mains connection points for each phase according to FIG. 6 or FIG. 8 respectively.

The reversal of the group 2 coils results in each block generating a pole of one polarity, that is to say four like poles, and this gives rise to consequent poles between them which are of opposite polarity.

By transposing the A and B coils in one of the blocks of a windings group, in an arrangement like that shown in FIG. 4, or similarly transposing A and B coils in an arrangement having more than two blocks per windings group, the slight imbalance of induced voltages in the two branches of the parallel network, due to the distance along the length of the stator between adjacent slots, may be mitigated, but not, in general, entirely cancelled because the absolute difference between the induced voltage in A and B coils in adjacent slots varies along the length of the stator. Nevertheless there will be instances, with multi-block winding groups, dependent on the shape of the curve of induced voltage over the length of the stator, where complete cancellation of disparities of induced voltage between A and B coils accommodate in adjacent slots, will be attainable over a substantial part of the required speed range, by transposing the A and B coils of selected blocks of each winding group.

Where more poles are required a larger number of windings groups are needed, it is convenient to retain the concept of a No. 1 windings group and a No. 2 windings group but to regard each group as being subdivided into a plurality of sub-groups or blocks the sub-groups or blocks of one group being interleaved with those of the other group.

Figure 8:
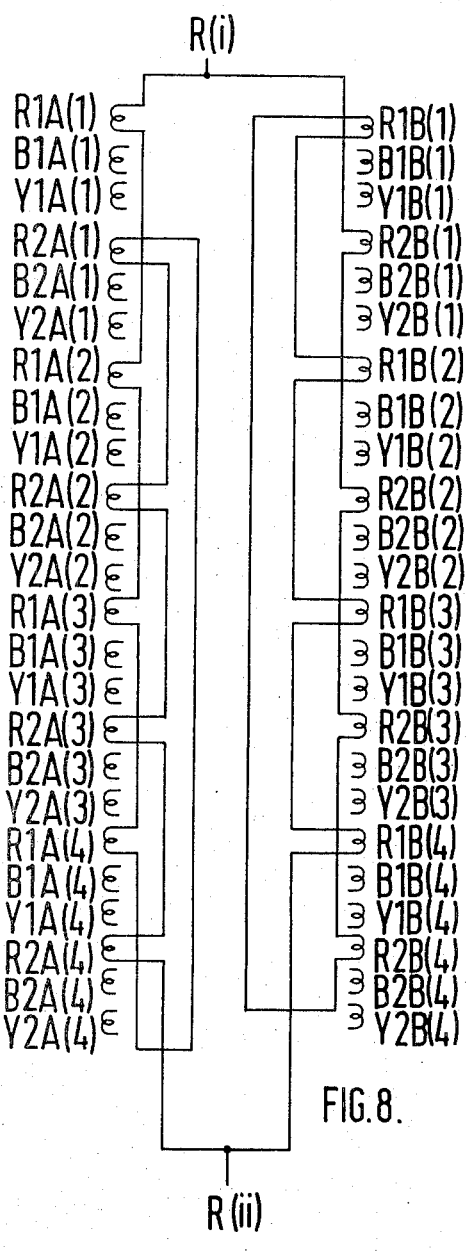
FIG. 8 is a circuit diagram corresponding to FIG. 5 but with the windings groups of FIG. 5 each divided into sub-groups or blocks.
Figure 9:
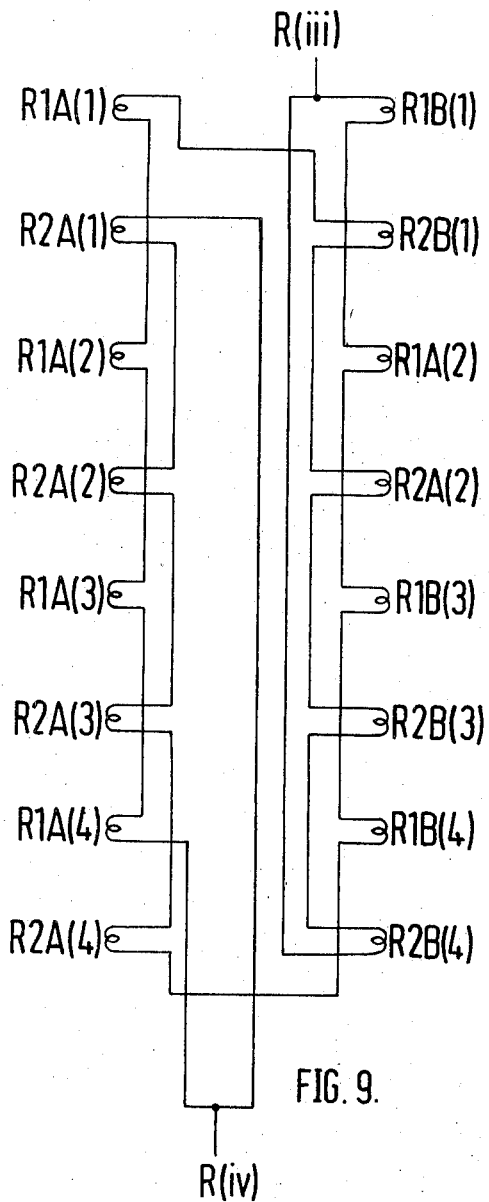
FIG. 9 is a circuit diagram corresponding to FIG. 6 but with the windings groups of FIG. 6 each divided into sub-groupsor blocks.

This is illustrated in FIG. 8 and 9 where each group has four blocks connected in series. Again, in these two Figures, only the Red phase connections are shown, with the A coils on the left and the B coils on the right. FIG. 8 corresponds with FIG. 5 and FIG. 9 with FIG. 6. The difference blocks of the windings groups are denoted by bracketed numerical postscripts following the identification symbols used (as in FIGS. 5 to 7) for the various phase bands, e.g., R1A(1) — R1A(2) — R1A(4) etc.

Figure 10:
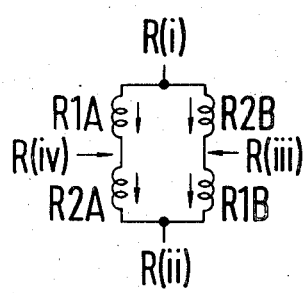
FIG. 10 and 11 are simplified circuit diagrams of the circuits shown in FIGS. 6 and 7 respectively illustrating the effect of changing the supply connection points.
Figure 11:
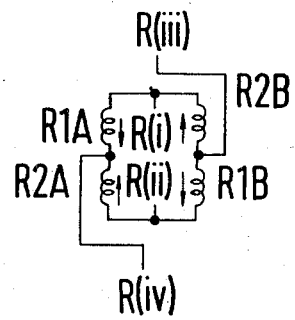

So far as the interconnections are concerned, and the change of mains connections between R(i) / R(ii) and R(iii) / R(iv), FIGS. 8 and 9 are self-explanatory. FIGS. 10 and 11 show in schematic form the effects of the changes of mains connection points without regard to the positions of the phase bands on the stator core. Arrows indicate the relative directions of current flow at a particular instant. Thus, in FIG. 8 the current flow in the Group 2 windings is the same as that in the Group 1 windings, and in FIG. 9 it is in the opposite direction.

Figure 12:
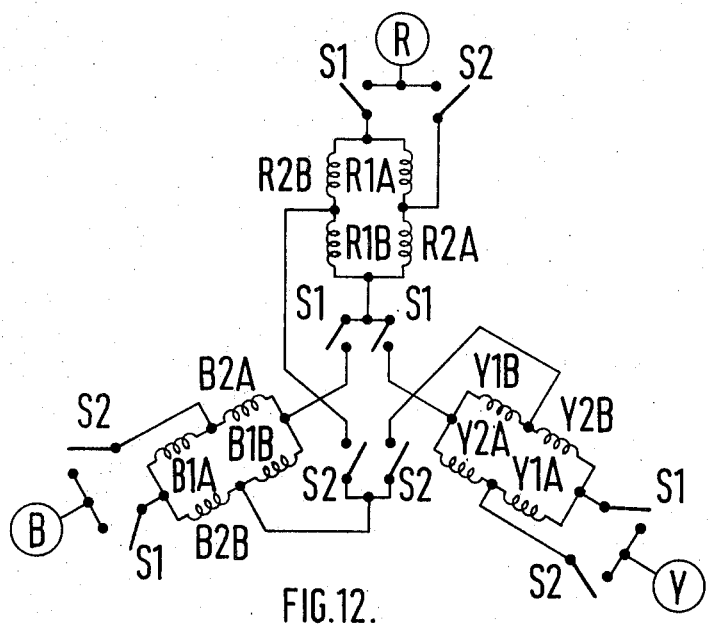
FIG. 12 is a schematic circuit diagram of an arrangement according to FIGS. 3 and 4 illustrating switching arrangements for selecting between the FIG. 3 configuration and the FIG. a configuration.

FIG. 12 shows a switching scheme for a parallel/parallel three phase pole changing arrangement. This is a star configuration for both pole numbers. Closing the S1 switch contacts gives one pole number. Closing the S2 switch contacts gives the other pole number.

A further advantage of the invention, in a pole changing motor of the short stator type, is that it permits the necessary switching to be achieved with fewer switch contacts. This is explained below in relation to FIGS. 13 and 14.

On the assumption that parallel connection of windings in a short stator motor is unacceptable when the invention is not used a star-to-delta pole change switching arrangement has been selected for the comparison. FIG. 13 shows a star-to-delta configuration in accordance with the invention, with group includes a and group 2 coils in parallel according to FIGS. 3 and 4, each set both the star and the delta configurations.

The FIG. 3 condition is obtained by closing the six contacts of switch 1S, the windings being then in the delta configuration.

The FIG. 4 condition is obtained by opening the 1S switch contacts and closing the five contacts of switch 2S.

With all the six contacts of switch 1S opened the motor is isolated from the main supply, which is almost always an essential requirement.

The total number of contacts required is 11.

FIG. 14 shows the nearest equivalent circuit for a pole changing motor not incorporating the invention. With the five contacts of switch 1S closed the star configuration is obtained with groups in series for each phase.

With the six contacts of switch 2S closed the delta configuration is obtained, again with the coil groups in series for each phase.

The eleven contacts of switches 1S and 2S are essential for effecting the pole-changing transformation between the star and the delta configurations but they cannot be arranged also to isolate the motor from the main supply. The three additional contacts of switch 1 are therfore required, making a total of 14 switch contracts as compared with the 11 contacts required for the FIG. 13 arrangement. Three contacts are therfore saved by means of the invention; a saving of 21.4 per cent.

The star-to-delta arrangement of FIG. 14 is not perfectly balanced so far as the induced voltages are concerned, in the delta configuration. The alternative of separate change-over switching for the R2, B2 and Y2 coil groups in a series-star configuration for both pole numbers, requires a minimum of 12 switch contacts which can also isolate the motor from the main supply with all switch contacts open. This arrangement is comparable with that of FIG. 10 where pole changing and isolation from the main supply is achieved with a total of 10 switch contacts, a saving of 16.6 per cent.

If the invention is to be applied to a transverse-flux linear induction motor, the two coils of each pair can be wound on the outer limbs of the core.

We claim:

1. A stator for a plural phase alternating current short stator electric induction machine, comprising a plurality of sets of coils, each set containing the same number of coils and all coils of each set being disposed closely adjacent to one another and so connected as to provide poles of the same polarity, a plurality of phase bands for each phase, each phase band comprising at least one coil, a series of groups of windings successively displaced along the length of the stator, each group comprising the same number of phase bands for each phase as the number of coils in each set, a plurality of circuit branches for each phase equal in number to the number of coils in each set, each circuit branch containing one phase band from each group of windings, and a parallel circuit for each phase formed by connecting said circuit branches in parallel one with another.

2. A stator as claimed in claim 1, in which each set of coils consists of two coils.

3. A stator as claimed in claim 2, having two groups of windings, in which each branch of each parallel circuit has an intermediate connection point at the junction between the phase bands of the two groups of windings in the branch, whereby the direction of current flow is reversed in the phase bands of one of the groups of windings.

4. A stator as claimed in claim 3, including switching means adapted, in a first state, to connect the ends of the two branches of each parallel circuit between successive phases of the plural phase supply and, in a second state, to connect the intermediate points of each parallel circuit between a respective phase of the supply and a common neutral point.

5. A stator as claimed in claim 2, in which each of the groups of windings is divided into a plurality of sub-groups, the sub-groups of each group of windings being interleaved with the sub-groups of the other groups of windings along the length of the stator.

6. A stator as claimed in claim 5, including switching means operative in a first state to connect each parallel circuit to the supply in such a manner that the instantaneous current in corresponding coils of the two groups is in the same direction and operative in a second state to connect each parallel circuit to the supply in such a manner that the instantaneous current in the coils of one group of windings is in the opposite direction to that of corresponding coils in the other group of windings, whereby the pole number of the machine is changed.

7. A stator as claimed in claim 1, in which the stator includesa core having slots for receiving the windings, the coils of eachset of coils being accommodated in the same slot.

8. A stator as claimed in claim 1, in which the stator includes a core having slots for receiving windings, the coils of each set of coils being accommodated in adjacent slots.

* * * * *